US 9,017,201 B2

(12) United States Patent
Hino et al.

(10) Patent No.: US 9,017,201 B2
(45) Date of Patent: *Apr. 28, 2015

(54) BICYCLE DRIVE UNIT

(75) Inventors: Tetsuya Hino, Osaka (JP); Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 152 days.

This patent is subject to a terminal disclaimer.

(21) Appl. No.: 13/608,151

(22) Filed: Sep. 10, 2012

(65) Prior Publication Data

US 2013/0095971 A1    Apr. 18, 2013

(30) Foreign Application Priority Data

Oct. 13, 2011    (JP) ................................. 2011-226207

(51) Int. Cl.
| | |
|---|---|
| *B62M 6/40* | (2010.01) |
| *B62M 11/04* | (2006.01) |
| *B62M 6/55* | (2010.01) |
| *B62M 6/65* | (2010.01) |
| *B62M 6/60* | (2010.01) |
| *B62M 11/14* | (2006.01) |

(52) U.S. Cl.
CPC ................. *B62M 6/55* (2013.01); *B62M 11/04* (2013.01); *B62M 6/65* (2013.01); *B62M 6/40* (2013.01); *B62M 6/60* (2013.01); *B62M 11/145* (2013.01); *Y10T 74/19056* (2015.01)

(58) Field of Classification Search
CPC .......... B62M 11/04; B62M 6/65; B62M 6/40; B62M 6/55; B62M 6/60
USPC .................................. 475/1–10; 180/206, 220
See application file for complete search history.

(56) References Cited

U.S. PATENT DOCUMENTS

| | | | |
|---|---|---|---|
| 4,346,777 A * | 8/1982 | Restelli .......................... 180/220 |
| 6,196,347 B1 * | 3/2001 | Chao et al. ................. 180/206.2 |
| 6,418,797 B1 | 7/2002 | Ambrosina et al. | |
| 6,487,936 B1 * | 12/2002 | Wu et al. ...................... 74/665 B |
| 6,516,908 B2 * | 2/2003 | Tseng .......................... 180/206.2 |
| 6,629,574 B2 | 10/2003 | Turner | |
| 8,651,993 B1 * | 2/2014 | Watarai .......................... 475/205 |
| 2010/0170731 A1 * | 7/2010 | Jordan .......................... 180/65.7 |
| 2011/0183805 A1 * | 7/2011 | Chan ............................. 475/254 |
| 2011/0303474 A1 * | 12/2011 | Kimmich et al. ........... 180/206.3 |
| 2012/0012412 A1 * | 1/2012 | Moeller et al. ............. 180/206.2 |
| 2012/0305325 A1 * | 12/2012 | Ito ............................... 180/206.6 |

FOREIGN PATENT DOCUMENTS

| | | |
|---|---|---|
| CN | 2179329 Y | 10/1994 |
| DE | 10 2010 004 552 A1 | 7/2011 |
| DE | 10 2010 028 667 A1 | 11/2011 |
| JP | 8-282575 A | 10/1996 |
| JP | 3029547 U | 10/1996 |
| JP | 9-328091 A | 12/1997 |
| JP | 9-328092 A | 12/1997 |

(Continued)

*Primary Examiner* — Tisha Lewis
(74) *Attorney, Agent, or Firm* — Global IP Counselors

(57) ABSTRACT

A bicycle drive unit includes a motor, a transmission mechanism and a torque combining member. The motor includes a crank axle receiving hole. The transmission mechanism includes a plurality of selectable gear ratios. The torque combining member is operatively coupled to the motor and the transmission mechanism to combine an output of the motor and an output of the transmission mechanism together.

17 Claims, 15 Drawing Sheets

(56) References Cited

FOREIGN PATENT DOCUMENTS

| | | |
|---|---|---|
| JP | 11-20772 A | 1/1999 |
| JP | 11-129974 A | 5/1999 |
| JP | 11-240481 A | 9/1999 |
| JP | 2004-249995 A | 9/2004 |
| JP | 3985930 B2 | 7/2007 |
| JP | 4036776 B2 | 11/2007 |
| JP | 4056130 B2 | 12/2007 |
| JP | 3146138 U | 11/2008 |
| JP | 2010-013028 A | 1/2010 |
| WO | WO 2010105610 A1 * | 9/2010 |
| WO | WO 2011102275 A1 * | 8/2011 |

* cited by examiner

BICYCLE DRIVE UNIT

CROSS-REFERENCE TO RELATED APPLICATIONS

This application claims priority under 35 U.S.C. §119 to Japanese Patent Application No. 2011-226207, filed Oct. 13, 2011. The entire disclosure of Japanese Patent Application No. 2011-226207 is hereby incorporated herein by reference.

BACKGROUND

1. Field of the invention

This invention generally relates to a drive unit for an electrically assisted bicycle that uses a motor output as an assisting power and has a transmission mechanism.

2. Background Information

One example of an electrically assisted bicycle is disclosed in Japanese Patent Publication No. 4036776 in which the electrically assisted bicycle has a transmission mechanism and an output from a motor is used as an assisting power. In the electrically assisted bicycle disclosed in this Japanese Patent Publication, a pedaling force inputted by the pedals is transmitted through the transmission mechanism and the transmitted drive fierce is then combined with a drive force from the motor. The combined drive force is then transmitted to a rear wheel of the bicycle to rotate the rear wheel.

SUMMARY

The bicycle drive unit of the above mentioned Japanese Patent Publication has a long and bulky casing because it includes three shafts (i.e., a crank axle, a shaft of the transmission mechanism and an output shaft). Consequently, the degree of design freedom of the bicycle decreases and the weight of the bicycle increases.

The present invention was conceived in view of the problem just explained. One object is to provide a lighter more compact drive unit for a bicycle having both a transmission mechanism and a motor for assisted riding.

In order to achieve the aforementioned object, a bicycle drive unit is provided that basically comprises a motor, a transmission mechanism and a torque combining member. The motor includes a crank axle receiving hole. The transmission mechanism includes a plurality of selectable gear ratios. The torque combining member is operatively coupled to the motor and the transmission mechanism to combine an output of the motor and an output of the transmission mechanism together.

Since the motor can be arranged on the cranks axle, the bicycle drive unit can be made lighter and more compact. Also, since the transmission mechanism enables a plurality of gear ratios to be set selectively, the assistance drive provided by the motor can be utilized efficiently.

In another aspect, it is acceptable for the bicycle drive unit to further include a crank axle. With this aspect, a pedaling force of a rider can be transmitted to the transmission mechanism.

In another aspect, it is acceptable for the rotational axis of the crank axle and the rotational axis of the motor to be coincident with each other. With this aspect, since the motor can be arranged on the crank axle, the bicycle drive unit can be made lighter and more compact.

In another aspect, it is acceptable for a sprocket to be connected to the torque combining member. With this aspect, the output of the torque combining member can be transmitted to a rear hub.

In another aspect, it is acceptable for the output of the motor to be transmitted to the torque combining member through a one-way clutch. With this aspect, the torque of the crank axle can be prevented from being transmitted to the motor.

In another aspect, it is acceptable for bicycle drive unit to have a reduction gear mechanism and for the output of the motor to be transmitted to the torque combining member through the reduction gear mechanism. With this aspect, since the speed of the motor output can be reduced before the output is transmitted to the torque combining member, it is possible to obtain a torque combining member that allows the motor to be operated efficiently.

In another aspect, it is acceptable for the crank axle to be connected to an input part of the transmission mechanism. With this aspect, a pedaling force of a rider can be transmitted to the transmission mechanism.

In another aspect, it is acceptable for the transmission mechanism to have a planetary gear mechanism. In the same aspect, it is also acceptable for the planetary gear mechanism to have a carrier with planet gears and for the carrier to be supported on an output part of the transmission mechanism. With this aspect, a bicycle equipped with the drive unit can change gear ratios with respect to rotation of the crank axle.

In another aspect, it is acceptable for the bicycle drive unit to have a first rotational axis about which the crank axle and the motor rotate and a second rotational axis about which the transmission mechanism rotates. It is further acceptable for the input part and the output part of the transmission mechanism to rotate about the second rotational axis. Since this bicycle drive unit has two axes, the drive unit can be made lighter and more compact. Also, the unit is also easier to assemble because the motor rotates about a different rotational axis than the structurally complex transmission mechanism rotates.

In another aspect, it is acceptable for the torque combining member to be arranged to one side of the motor along the direction of the rotational axis of the motor and a torque coupling mechanism for coupling the crank axle and the transmission mechanism to be arranged to the other side of the motor along the direction of the rotational axis of the motor. With this aspect, the torque coupling mechanism and the torque combining member are arranged apart from each other on both sides of the motor and it is easier to achieve a balanced weight distribution along the direction of the rotational axis of the crank axle.

In another aspect, it is acceptable for the torque coupling mechanism to have a gear wheel. In this aspect, it is further acceptable for the input part of the transmission mechanism to have a gear wheel that meshes with the gear wheel of the torque coupling mechanism. With this aspect, the durability is improved over a structure in which the input part of the transmission mechanism and the torque coupling mechanism are coupled with a belt or the like.

In another aspect, it is acceptable for the rotational axis of the torque combining member to be coincident with the rotational axis of the crank axle. With this aspect, since the rotational axis of the torque combining member and the rotational axis of the crank axle are the same, the bearings of these shafts can be integrated into a single unit and the bicycle drive unit can be made even lighter and more compact.

In another aspect, it is acceptable for the output part to have a first coupling part connecting the torque combining member to the output part of the transmission mechanism and a second coupling part connecting the torque combining member to the motor. In this aspect, it is further acceptable for the first coupling part to have an externally toothed gear wheel and for the second coupling part to have internal clutch grooves. With this aspect, the drive unit can combine the rotary torque of the crank axle and the rotary torque of the motor together.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
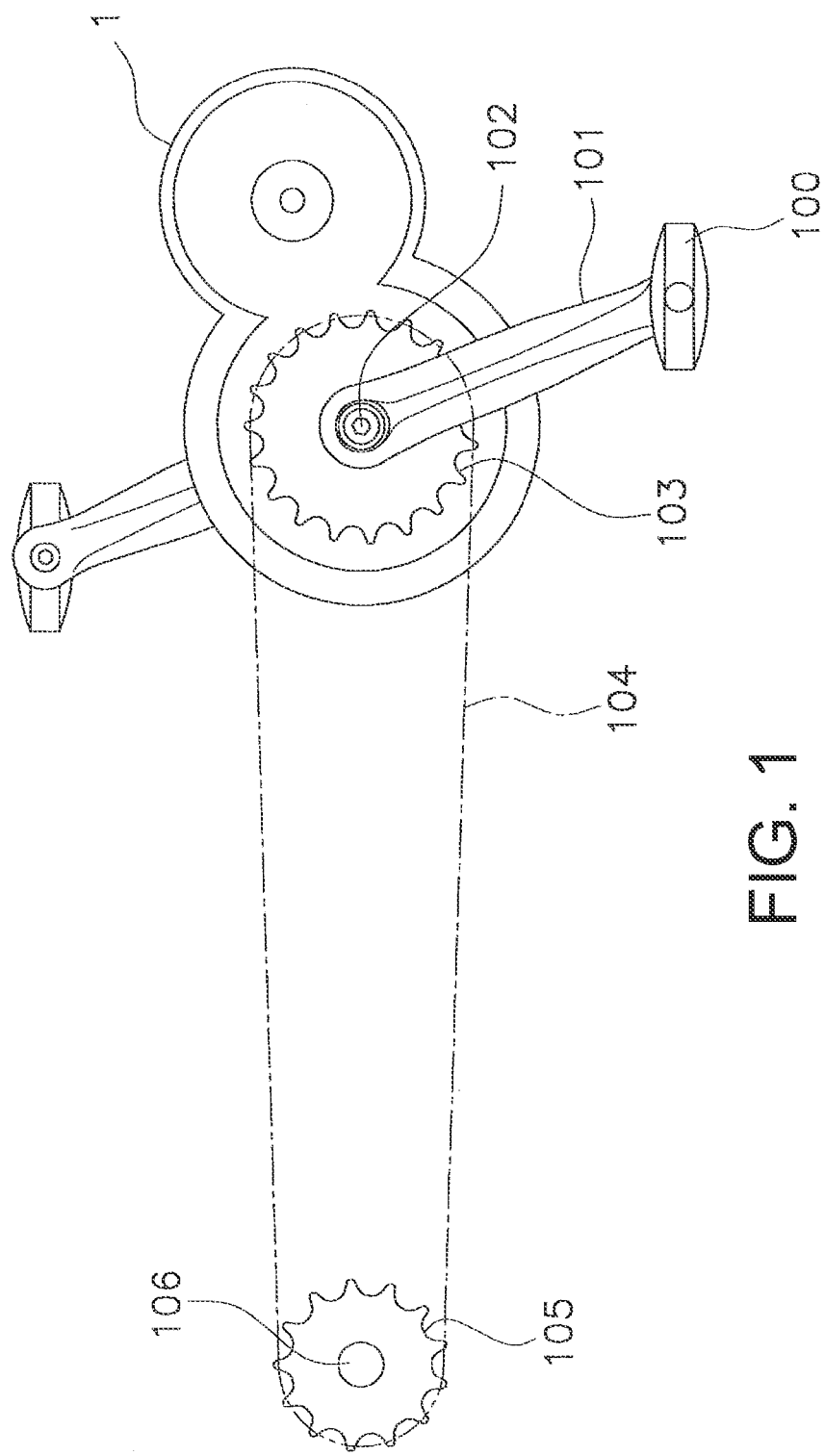
FIG. 1 is a simplified side elevational view of an electrically assisted bicycle equipped with a drive unit in accordance with a first embodiment.

Referring initially to FIG. 1, a bicycle drive unit 1 is illustrated in accordance with a first embodiment. In particular, FIG. 1 is a simplified, right side elevational view of an electrically assisted bicycle having the drive unit 1, as described below. The electrically assisted bicycle has a pair of pedals 100. The pedals 100 are each rotatably mounted to a crank arm 101. The crank arms 101 are fixed to an end so a crank axle 102 that is operatively connected to a front sprocket 103 via the drive unit 1. The front sprocket 103 drives a chain 104 which in turn drives a rear sprocket 105. The rear sprocket 105 is mounted to a wheel axle 106 of a rear wheel. Thus, in this electrically assisted bicycle, a pedaling force acting on the pedals 100 is transmitted along the following path: the crank arms 101→the crank axle 102→the drive unit 1→the front sprocket 103→the chain 104→the rear sprocket 105→the wheel axle 106 of the rear wheel. As explained below, the drive unit 1 includes an assistance motor 120 that supplements the pedaling force of the rider. In the first embodiment, the crank axle 102 and the output shaft of the motor 120 are coaxial while a shaft of the transmission mechanism 140 is offset from the crank axle 102 such that the drive unit 1q has a two-axle structure.

With this arrangement, the pedaling force is combined with the assisting force provided by a motor output of the assistance motor 120 such that a combined output force is transmitted to the rear wheel axle 106. Normally, a torque detecting device detects a torque acting on the crank axle 102 and when the detected value exceeds a set value, the assistance motor 120 is started to generate an assisting torque corresponding to the amount by which the detected torque is insufficient. The torque detecting device preferably comprises a magnetorestrictive element and a detection coil arranged on the crank axle 102. The torque detecting device serves to detect torsional strain of the crank axle 102. As explained below, the assistance motor 120 is typically arranged near a frame joint portion where a bottom end portion of the seat tube and a rearward end portion of the down tube of the frame join together. A battery is typically arranged on a rear carrier, the down tube, or the seat tube for driving the assistance motor 120.

Figure 2:
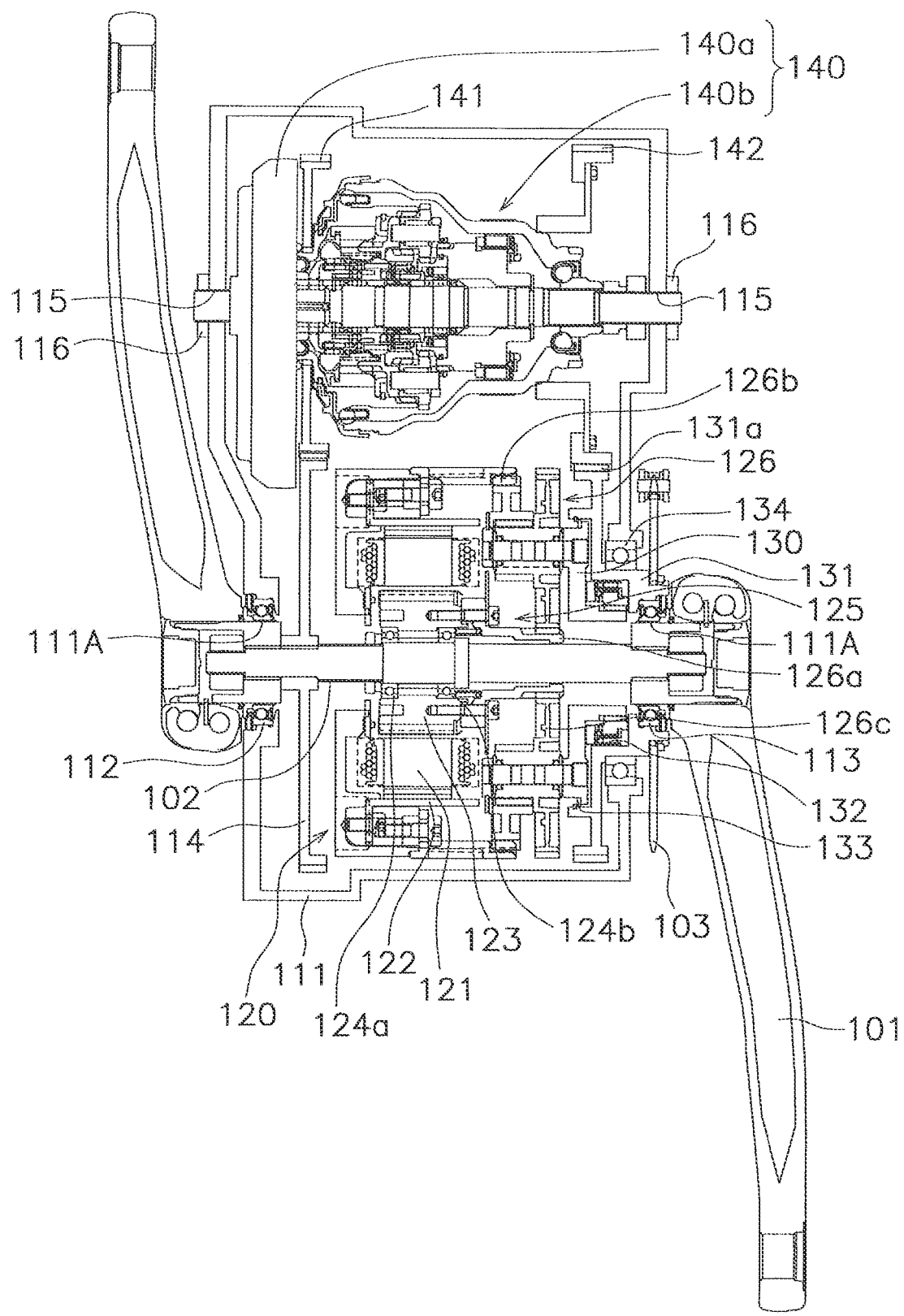
FIG. 2 is a cross sectional view of a drive unit according to a first embodiment.

The structure and function of the drive unit 1 will now be explained with reference to FIG. 2. FIG. 2 is a cross sectional view of the drive unit 1 according to the first embodiment. As shown in FIG. 2, in this drive unit 1, the crank axle 102 is inserted through a through hole 111A in a casing 111. The crank axle 102 is supported rotatably in the casing 111 by a pair of rolling bearings 112 and 113. The crank arms 101 are detachably mounted on to opposite ends of the crank axle 102. The crank arms 101 are arranged on an exterior of the casing 111.

The motor (electric motor) 120 is arranged such that its rotational axis is coincident with the rotational axis of the crank axle 102. The motor 120 basically includes a stator 121, a mounting structure 122 and a rotor 123. The stator 121 is arranged coaxially with the crank axle 102. A field coil is wound onto the stator 121. The stator 121 is fixed to the casing 111 with the mounting structure 122. The rotor 123 is supported rotatably on the crank axle 102. The rotor 123 has, for example, a plurality of magnets (not shown) having a plurality of magnetic poles. The magnetic poles of the rotor 123 are arranged along a circumferential direction with a magnet holding section (not shown) holding the magnets. In this embodiment, the motor 120 is an inner rotor type motor in which an outer perimeter of the rotor 123 is surrounded by the stator 121. The rotor 1123 is supported rotatably on the crank axle 1102 with a first bearing 124a and a second bearing 124b arranged spaced apart along the axial direction of the crank axle 102. The motor 1120 is driven with an inverter that is not shown in the drawings. The inverter is operated by a controller (not shown in the drawings), and the controller controls the inverter according to a detected pedaling force and a detected bicycle speed.

A reduction gear mechanism 125 transmits rotation of the rotor 123 to a torque transmitting member 130, and also transmits rotation of the torque transmitting member 130 to the rotor 123. The reduction gear mechanism 125 preferably includes a planetary gear mechanism 126. The planetary gear mechanism 126 has a sun gear 126a, an internally toothed ring gear 126b arranged around the outside circumference of the sun gear 126a, and a plurality of (e.g., three) planet gears 126c that mesh with the sun gear 126a and the internally toothed ring gear 126b. The sun gear 126a is fixed to the rotor 123. The internally toothed ring gear 126b is fixed on the mounting structure 122. The planet gears 126c are rotatably supported b the torque transmitting member 130. The torque transmitting member 130 is a so-called carrier of the planet gears 126c. Each of the planet gears 126c has a first gear part and a second gear part having different tooth counts. The first gear part has a larger number of teeth than the second gear part. The first gear part meshes with the sun gear 1126a and the second gear part meshes with the internally toothed ring gear 126b. The torque transmitting member 130 is rotatably supported on an inside face of a torque combining member 131 (explained in detail later) through a one-way clutch 132 and a rotation supporting section 133. The rotation supporting section 133 is a friction bearing in this embodiment, but it is acceptable to use a rolling bearing. The rotation supporting section 133 is arranged farther outward in a radial direction of the crank axle than the one-way clutch 132. In this planetary gear mechanism 126, since the internally toothed ring gear 126b is fixed non-rotatably with respect to the casing 111, the speed of the rotation of the sun gear 126a to which the rotor 123 is coupled is reduced before it is transmitted to the torque transmitting member 130.

The torque coupling mechanism comprises a first gear wheel 114 and a second gear wheel 141. The transmission mechanism 140 comprises a transmission mechanism motor unit 140a and a transmission mechanism main body 140b. The torque coupling mechanism serves to couple the crank axle 102 and a transmission mechanism main body 140b together. The first gear wheel 114 is provided on one end portion of the crank axle 102. The first gear wheel 114 is fixed to the crank axle 102 and rotates as a unit with the crank axle 102. It is acceptable for the first gear wheel 114 to be detachably mounted to the crank axle 102 with, for example, serrations. The second gear wheel 141 is a member that transmits torque to the transmission mechanism 140 and meshes with the first gear wheel 114. The torque coupling mechanism is arranged on the opposite side of the motor 120 as the torque combining member 131 and the front sprocket 103.

The transmission mechanism motor unit 140a rotates an engaging body 88 of the transmission mechanism main body 140b through a prescribed phase in response to a rider's command issued from a gear shifter (not shown) attached to a handlebar. The transmission mechanism motor unit 140a is, for example, the motor unit that is disclosed in Japanese Patent No. 3529723. The transmission mechanism main body 140b is a transmission having a plurality of selectable gear ratios. In this embodiment, the transmission mechanism main body 140b includes a rotation transmitting mechanism that has at least one planet gear and a sun gear. The transmission mechanism main body 140b is configured such that a plurality of gears can be engaged selectively and a control mechanism that makes a portion of these gears able to rotate or unable to rotate. FIG. 2 is a detailed schematic view illustrating the transmission mechanism main body 140b exemplifying a transmission mechanism having three selectable gears.

Figure 3:
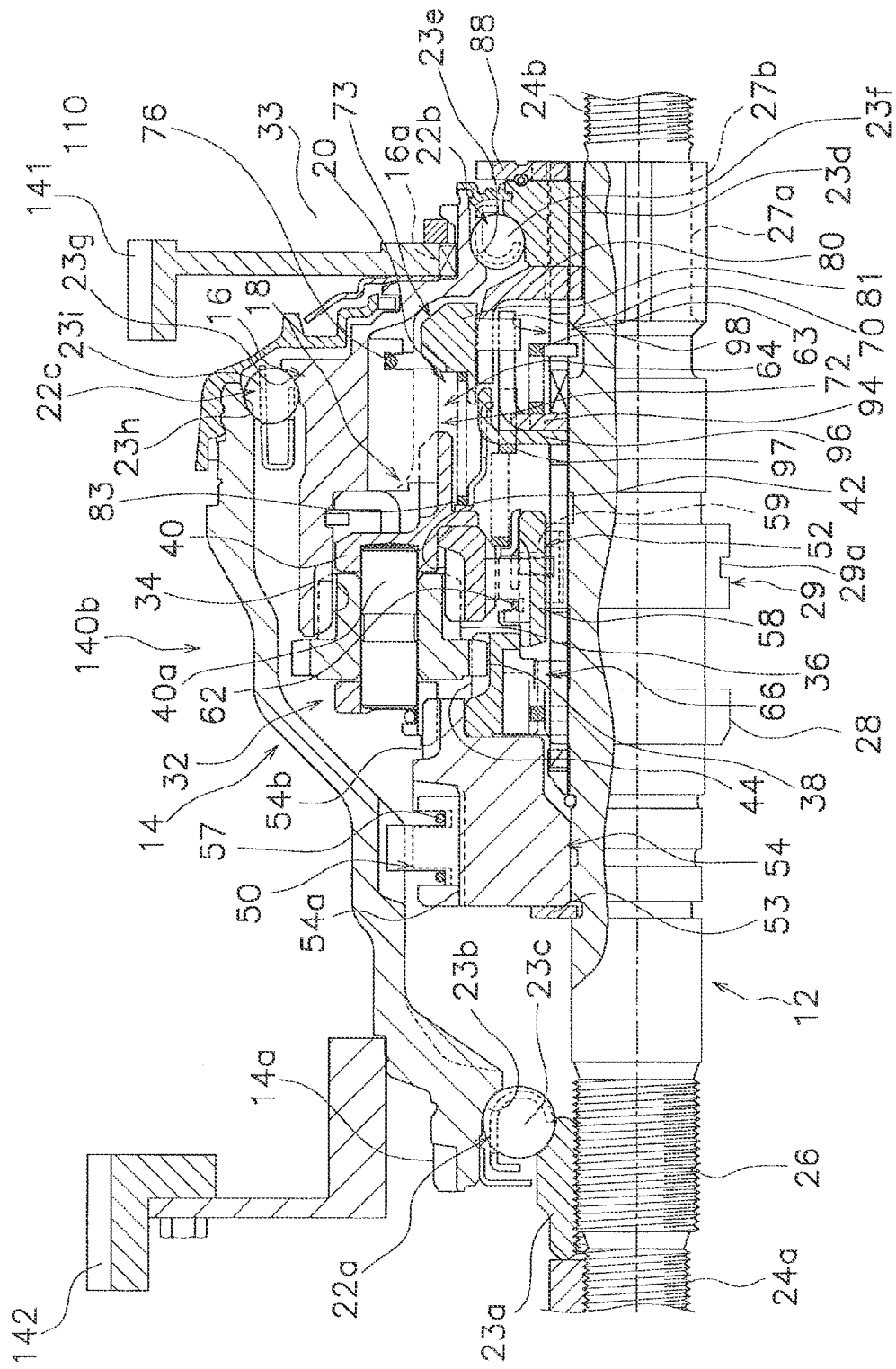
FIG. 3 is a vertical cross sectional view of an internal gear hub in accordance with the first embodiment.

As shown in FIG. 3, the transmission mechanism main body 140b comprises a shaft 12, an output part 14, a driver 16 (e,g., an input part), a rotation transmitting mechanism 18 and a gear changing mechanism 20. The shaft 12 can be attached non-rotatably to the casing 111. To facilitate the explanation, the orientation of the transmission mechanism main body 140b as depicted in FIG. 3 is reversed in terms of the left and right directions in relation to the orientation of the transmission mechanism main body 140b as depicted in FIG. 2. The output part 14 and the driver 16 have cylindrical shapes. The output part 14 and the driver 16 cover the rotation transmitting mechanism 18 and the gear changing mechanism 20. One end (left end in FIG. 3) of the output part 14 is rotatably supported on the shaft 12 with bearing 22a. The driver 16 is rotatably supported on the shaft 12 with a bearing 22b. The other end of the output part 14 (right end in FIG. 3) is rotatably supported on the driver 16 with a bearing 22c.

The bearing 22a comprises a pushing race 23a configured to screw onto an externally threaded section 26 (explained later) of the shaft 12, a receiving race 23b formed on an internal circumferential surface of one end of the output part 14, and steel balls 23c arranged between the pushing race 23a and the receiving race 23b. The bearing 22b comprises a pushing race 23d arranged on the hub axle 12 and prevented from rotating by a rotation preventing groove 276 (described later) formed in the shaft 12, a receiving race 23e formed on an internal circumferential surface of one end of the driver 16, and steel balls 23f arranged between the pushing race 23d and the receiving race 23e. The bearing 22c comprises a pushing race 23g formed on an external circumferential surface of the driver 16, a receiving race 23h formed on an internal circumferential surface of the other end of the hub shell 14, and steel balls 23i arranged between the pushing race 23g and the receiving race 23h.

Figure 4:
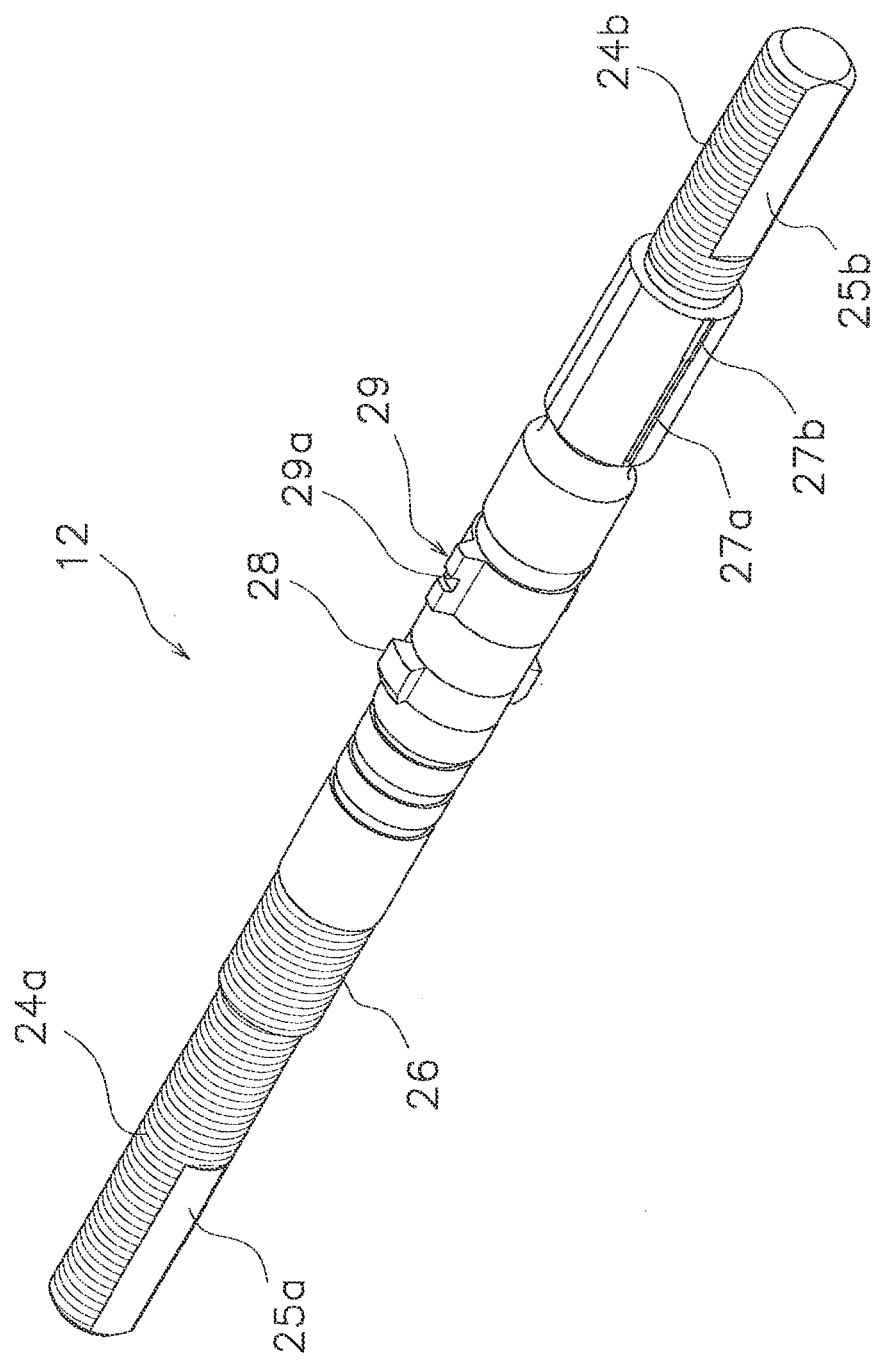
FIG. 4 is a perspective view of an axle of the internal gear hub that is illustrated in FIG. 3.

As shown in FIG. 4, first externally threaded sections 24a and 24b are formed on both end portions of the shaft 12 for fastening the shaft 12 with nuts 116 (see FIG. 2) at insertion openings 115 (see FIG. 2) formed in the casing 111. Rotation preventing sections 25a and 25b are formed in the first externally threaded sections 24a and 24b so as to be parallel to each other and serve to engage with the insertion openings 115 and prevent rotation of the hub axle 12. A second externally threaded section 26 for mounting the bearing 22a is formed on the shaft 12 in a position axially inward from the first externally threaded section 24a. Two rotation preventing grooves 27a for preventing rotation of the bearing 22b and two rotation preventing grooves 27b for preventing rotation of the gear changing mechanism 20 are formed in positions axially inward of the first externally threaded section 24b. The rotation preventing grooves 27a and 27b are configured to extend along an axial direction and have different widths. The two rotation preventing grooves 27a and the two rotation preventing grooves 27b are each separated from other in a circumferential direction by a 180-degree interval. First protrusions 28 and second protrusions 29 are formed in an axially middle portion of the shaft 12 and configured to protrude in a radially outward direction. The first protrusions 28 are separated from each other by a 180-degree interval and function as a one-way clutch of the gear changing mechanism 20, and the second protrusions 29 are separated from each other by a 180-degree interval and function to prevent rotation. A positioning recess 29a is formed in an axially middle portion of the second protrusions 29.

The hub shell 14 rotates freely about the shaft 12. As shown in FIG. 3, the output part 14 is a cylindrical member configured such that a diameter thereof increases in a step-like manner from one end (left end in FIG. 3) to the other end (right end in FIG. 3). The third gear wheel 142 is attached non-rotatably to an external circumference of the output second 14. The output part 14 can rotate as an integral unit with the third gear wheel 142.

The driver 16 is a cylindrical member mounted between the shaft 12 and the output part 14 such that it can rotate freely with respect to both the shaft 12 and the output part 14. The driver 16 is configured such that a diameter thereof decreases in a step-like manner as one moves toward one end (right end in FIG. 3) of the driver 16 The second gear wheel 141 is attached to the opposite end portion of the drive 16 as the end where the output part 14 is located. The driver 16 can rotate as an integral unit with the second gear wheel 141.

The rotation transmitting mechanism 18 has a planetary gear mechanism 32 that can transmit rotation of the driver 16 to the output part 14 with a plurality of (e.g., three) gear ratios. The planetary gear mechanism 32 comprises a ring gear 34, a first planet gear 36, a second planet gear 38, a carrier 40 configured to rotatably support the first and second planet gears 36 and 38, a first sun gear 42 configured and arranged to mesh with the first planet gear 36, and a second sun gear 44 configured and arranged to mesh with the second planet gear 38. The ring gear 34 is formed on an internal circumferential surface at the other end (left side in FIG. 3) of the driver 16. The first planet gear 36 is at least one gear that meshes with the ring gear 34. The second planet gear 38 has a larger number of teeth than the first planet gear 36 and arranged and configured such that it can rotate integrally with the first planet gear 36. Although in this embodiment the first planet gear 36 and the second planet gear 38 are formed as a one-piece integral unit, it is also acceptable for the two gears to be provided as separate entities. The carrier 40 is configured to rotatably support three first planet gears 36 and three second planet gears 38 such that the planet gears are arranged with equal spacing in a circumferential direction and arranged such that it can rotate freely about the shaft 12. The first sun gear 42 is a gear arranged to rotate about the shaft 12 and configured to mesh with the first planet gears 36. The second sun gear 44 is a gear arranged to rotate about the shaft 12 and configured to mesh with the second planet gears 38. The carrier 40 supports the first and second planet gears 36 and 38 with a plurality of (e.g., three) support shafts 40a arranged to be parallel to the shaft 12.

The rotation transmitting mechanism 18 also has a first one-way clutch 50 and a second one-way clutch 52.

Figure 5:
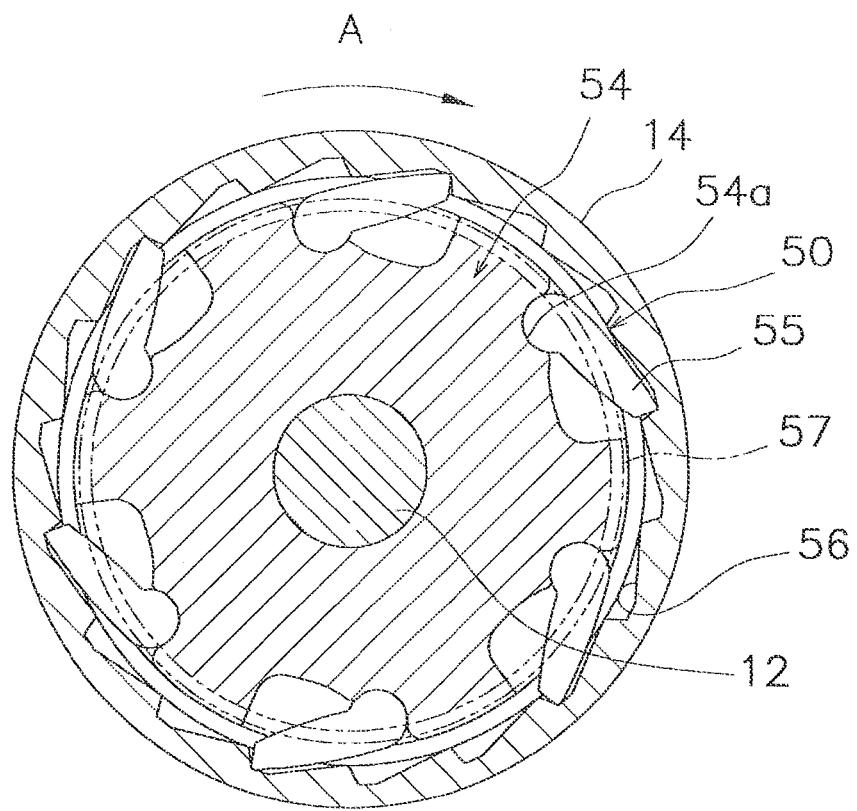
FIG. 5 is a transverse cross sectional view of a first one-way clutch of the internal gear hub that is illustrated in FIG. 3.

The first one-way clutch 50 has a first pawl support part 54 that is cylindrical and rotatably attached to the shaft 12. The first pawl support part 54 is coupled to the carrier 40 such that it rotates as an integral unit with the carrier 40. The first pawl support part 54 has a plurality of (e.g., six) first mounting recesses 54a that are arranged on an external circumferential surface of the second pawl support part 54 so as to be spaced apart along a circumferential direction and each configured to support a first clutch pawl 55 (explained later) such that the first clutch pawl 55 can pivot freely between an upright state and a prone state. Coupling recesses 54b are provided adjacent to the first mounting recesses 54a on one end (right-hand end in FIG. 3) of the pawl support part 54 and serve to couple the pawl support part 54 to the carrier 40 such that it can rotate as an integral unit with the carrier 40. Movement of the first pawl support part 54 in an axial direction is restricted by a retaining ring 53 attached to an external circumferential surface of the shaft 12. As shown in FIG. 5, the one-way clutch 50 only transmits rotation to the output part 14 in the forward advancement direction of the first pawl support part 54 (which is coupled to the carrier 40) indicated by the arrow A.

The first one-way clutch 50 further includes a plurality of (e.g., six) first clutch pawls 55 mounted in the first mounting recesses 54a such that the first clutch pawls 55 can pivot freely between an upright state and a prone state and first ratchet teeth 56 formed on an internal circumferential surface of the output part 14 and configured to mesh with the first clutch pawls 55. The first clutch pawls 55 are biased toward an upright state in which they mesh with the first ratchet teeth 56 by a first spring member 57 that is mounted onto an external circumferential surface of the first pawl support part 54.

Figure 6:
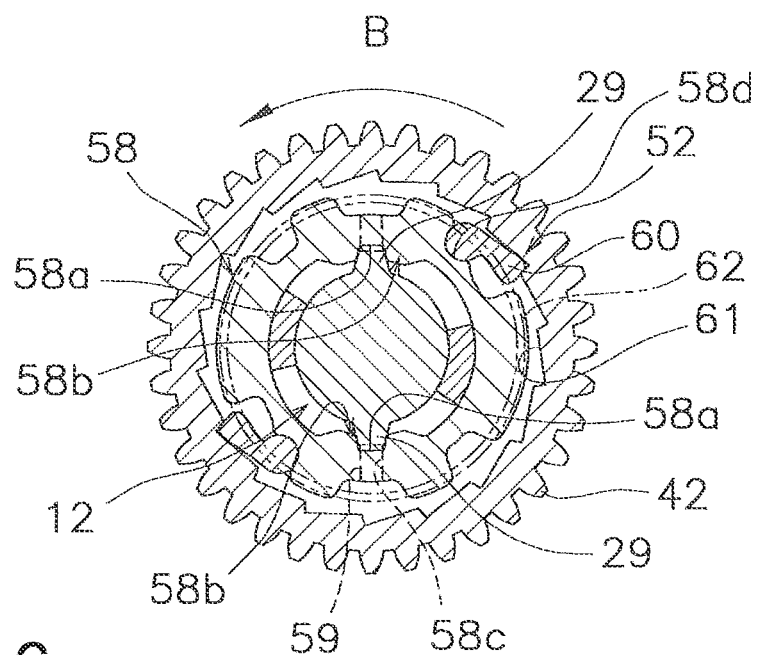
FIG. 6 is a transverse cross sectional view of a second one-way clutch of the internal gear hub that is illustrated in FIG. 3.

As shown in FIG. 6, the second one-way clutch 52 serves to prevent rotation of the first sun gear 42 in a direction opposite the forward advancement direction, i.e., in the direction indicated with an arrow B. As shown in FIG. 3, the second one-way clutch 52 has a cylindrical second pawl support part 58 that is connected non-rotatably to the shaft 12. As shown in FIG. 6, an internal circumferential surface of the second pawl support part 58 has engaging recesses 58a configured to engage with the second protrusions 29 of the shaft 12 and rotation preventing sections 58b configured to protrude in a radially inward direction. Movement of the second pawl support part 58 in an axial direction of the shaft 12 is restricted by a positioning pin 59 arranged and configured to engage with a positioning recess 29a. The positioning pin 59 is arranged in a securing hole 58c arranged along a radial direction of the second pawl support part 58. The second pawl support part 58 is thus connected to the shaft 12 such that cannot rotate and cannot move in an axial direction.

The second pawl support part 58 has a plurality of (e.g., two) second mounting recesses 58d that are arranged on an external circumferential surface of the second pawl support part 58 so as to be spaced apart along a circumferential direction and each configured to support a second clutch pawl 60 (explained later) such that the second clutch pawl 60 can pivot freely between an upright state and a prone state. The second pawl support part 58 also has a spring engaging hole 58e formed in an external circumferential surface thereof for holding an other end 97b of a first torsion spring 97 (described later) of the gear changing mechanism 20.

The second one-way clutch 52 further includes a plurality of (e.g., two) second clutch pawls 60 mounted in the second mounting recesses 58d such that they can pivot freely between an upright state and a prone state and second ratchet teeth 61 formed on an internal circumferential surface of the first sun gear 42 and configured to mesh with the second clutch pawl 60. The second clutch pawls 60 are biased toward an upright state in which they mesh with the second ratchet teeth 61 by a second spring member 62 that is mounted onto an external circumferential surface of the second pawl supporting section 58.

As shown in FIG. 3, the gear changing mechanism 20 has a moveable member 63 that can be moved by, for example, rotation of the output shaft of the motor of the transmission mechanism motor unit 140. The gear changing mechanism 20 further comprises a first clutch mechanism 64 configured to switch the driver 16 and the carrier 40 between a connected state and a disconnected state in response to a movement of the moveable member 63, a second clutch mechanism 66 configured to switch the second sun gear 44 between a rotatable state and a non-rotatable state in response to a movement of the moveable member 63, and an operating mechanism 70 configured to operate the first clutch mechanism 64 and the second clutch mechanism 66 in response to a movement of the moveable member 63.

Figure 8:
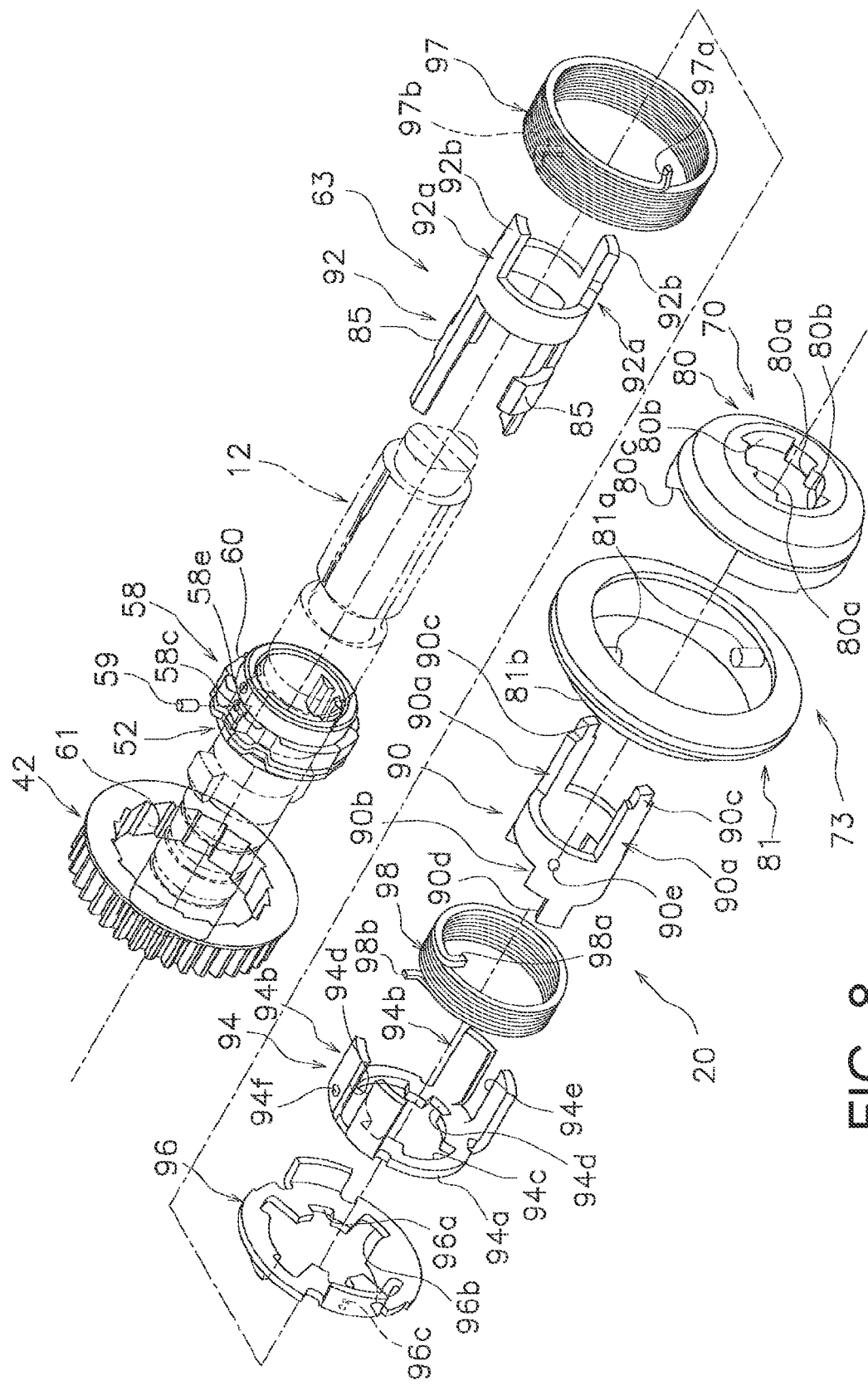
FIG. 8 is an exploded perspective view of a gear changing mechanism of the internal gear hub that is illustrated in FIG. 3.

As shown in FIGS. 3 and 8, the moveable member 63 has an holding member 88 (FIG. 3) configured to engage with the transmission motor unit 140a, a first cylindrical operating part 90 configured to move in coordination with the holding body 88, and a second cylindrical operating part 92 configured to move in coordination with the first cylindrical operating part 90.

The holding member 88 is turnably arranged on an external circumferential surface of the shaft 12 such that it is pressed against the pushing race 23*d* of the bearing 22*b* by the transmission mechanism motor unit 140*a* and a nut 160 that is screwed onto the first externally threaded section 24*b*. A driving ring (not shown) of the transmission mechanism motor unit 140*a* is stopped by the holding member 88. The holding member 88 turns when the transmission mechanism motor unit 140*a* is operated. The holding member 88 is positioned to one of three positions, i.e., a first position, a second position, or a third position, by the operation of the transmission mechanism motor unit 140. Hereinafter, the first position is called "high gear position," the second position is called "intermediate gear position," and the third position is called "low gear position." For example, the holding member 88 is turned to the low gear position when a gear shifter (not shown in the drawings) mounted on the handlebar is operated such that a command indicating the low speed gear is issued, and the holding member 88 is turned to the high gear position when the gear shifter (not shown) is operated such that a command indicating the high speed gear is issued.

The first cylindrical operating part 90 is turnably mounted on an external circumferential surface of the shaft 12. As shown in FIG. 8, the first cylindrical operating part 90 has a pair of circular arc-shaped engaging protrusions 90*a* configured to extend in an axial direction from one end (right end in FIG. 8) and engage with the holding member 88. A holding portion 90*c* having a slightly shorter dimension in a circumferential direction and configured to engage with the holding member 88 is formed on a tip end of each of the engaging protrusions 90*a*. The engaging portions 90*c* are configured to engage with an internal circumferential surface of the holding member 88 such that the first cylindrical operating part 90 is positioned to one of the three aforementioned positions when the holding member 88 is turned. The engaging protrusions 90*a* are configured to engage with the holding member 88 after passing through a passage recess 80*b* of a cam member 80.

A pair of first connecting pieces 90*b* configured to connect to the second cylindrical operating part 92 is provided on the other end (left end in FIG. 8) of the first cylindrical operating part 90. A tip end portion 90*d* of each of the first connecting pieces 90*b* has a shorter dimension in a circumferential direction than a base end portion of the same. A spring engaging hole 90*e* configured to engage with one end 98*a* (right end in FIG. 7) of a second torsion spring 98 (described later) is formed in an external circumferential surface of the first cylindrical operating part 90.

Figure 13:
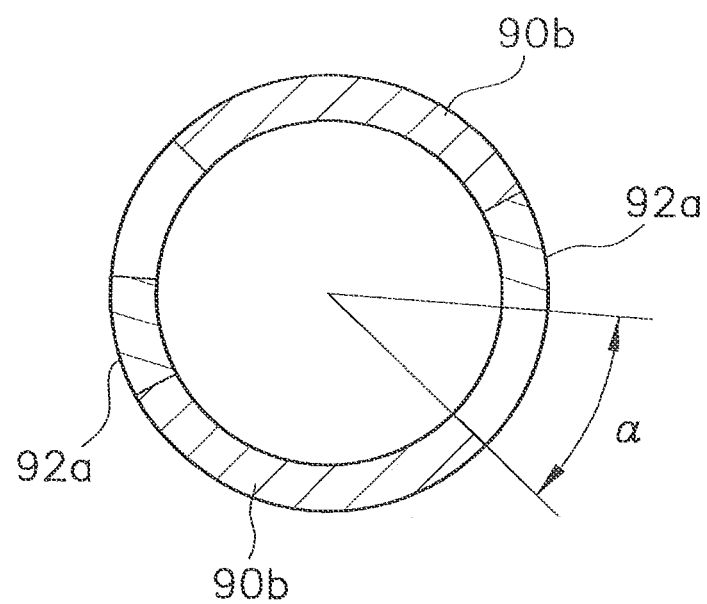
FIG. 13 is a transverse cross sectional view showing a range of relative rotation that can occur between the first operating cylinder and the second operating cylinder.

A pair of circular arc-shaped second connecting pieces 92*a* configured to engage with the first connecting pieces 90*b* of the first cylindrical operating part 90 is provided on one end (right end in FIG. 8) of the second cylindrical operating part 92. A tip end portion 92*b* of each of the second connecting pieces 92*a* has a shorter dimension in a circumferential direction than a base end portion of the same. As shown in FIG. 13, the first connecting pieces 90*b* and the second connecting pieces 92*a* can turn relative to each other up to a prescribed angle α (e.g., 40°). A pair of second controllers 85 for controlling the second clutch mechanism 66 are formed integrally on the other end (left end in FIG. 8) of the second cylindrical operating part 92.

Figure 7:
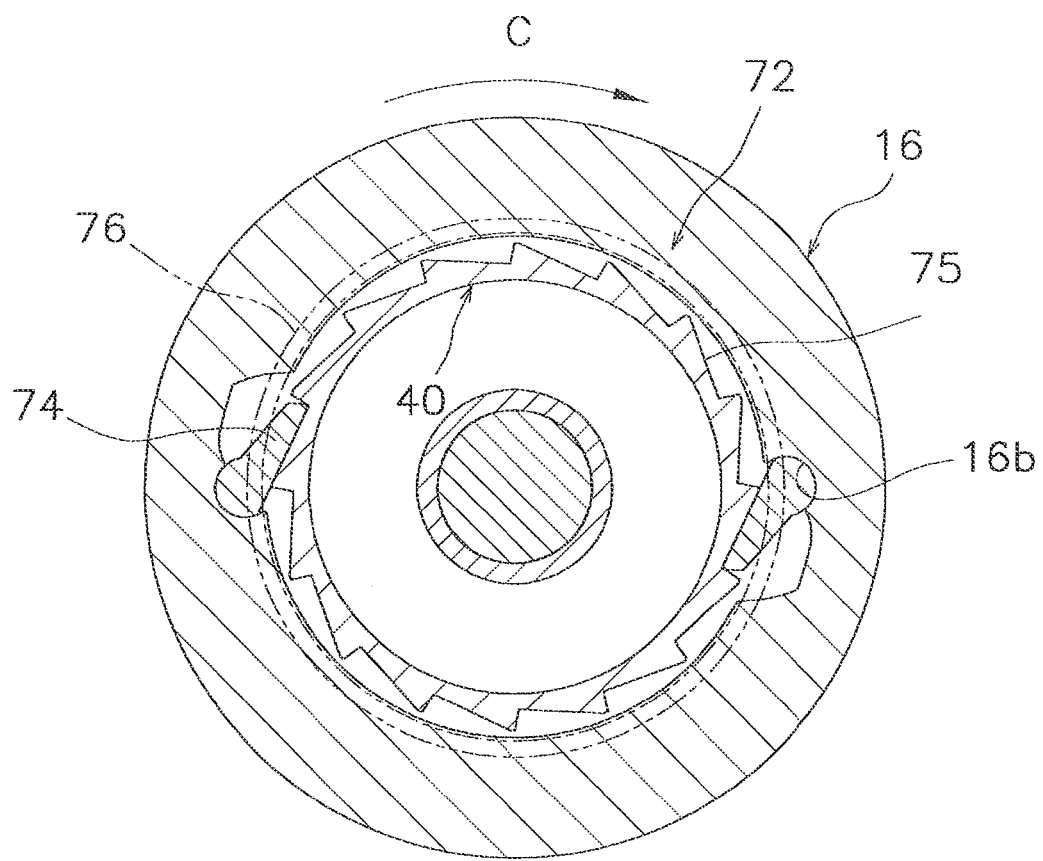
FIG. 7 is a transverse cross sectional view of a third one-way clutch of the internal gear hub that is illustrated in FIG. 3.

As shown in FIGS. 3, 7, and 8, the first clutch mechanism 64 has a third one-way clutch 72 arranged between the driver 16 and the carrier 40 and a first controller 73 configured to control the third one-way clutch 72 to a connected state or a disconnected state.

The third one-way clutch 72 is configured to transmit rotation from the driver 16 to the carrier 40 only in the forward advancement direction indicated by the arrow C. As shown in FIG. 7, the third one-way clutch 72 includes third clutch pawls 74 mounted in a plurality of (e.g., two) third mounting recesses 16*b* formed in an internal circumferential surface of the driver 16 and the third ratchet teeth 75 that are formed on an external circumferential surface of one end (right end in FIG. 3) of the carrier 40 and configured to mesh with the third clutch pawls 74. The third clutch pawls 74 are mounted in the fourth mounting recesses 16*b* such that they can pivot freely between an upright state and a prone state. The third clutch pawls 74 are biased toward an upright state such that they mesh with the third ratchet teeth 75 by a third spring member 76 that is attached to an internal circumferential surface of the drive body 16.

As shown in FIG. 8, the first controller 73 has a cam member 80 connected non-rotatably to the shaft 12 and a cam bearing member 81 rotatably arranged on the shaft 12.

The cam member 80 has generally the shape of a bottomed cylinder, and an engaging protrusion 80*a* for engaging with the rotation preventing groove 27*a* of the shaft 12 is provided on an internal circumferential surface of the cam member 80. The cam member 80 also has circular arc-shaped passage recesses 80*b* formed in an internal circumferential surface thereof for allowing the engaging protrusions 90*a* of the first cylindrical operating part 90 to pass through. The passage recesses 80*b* are configured to have a longer dimension in a circumferential direction than the engaging protrusions 90*a* such that the first cylindrical operating part 90 is allowed to turn within a prescribed range (e.g., approximately 40°). A pair of inclined cams 80*c* configured to engage with the cam bearing member 81 are formed on an end face of a cylindrical portion of the cam member 80. The inclined cams 80*c* each comprise an inclined surface configured to be sloped along a circumferential direction.

Figure 9:
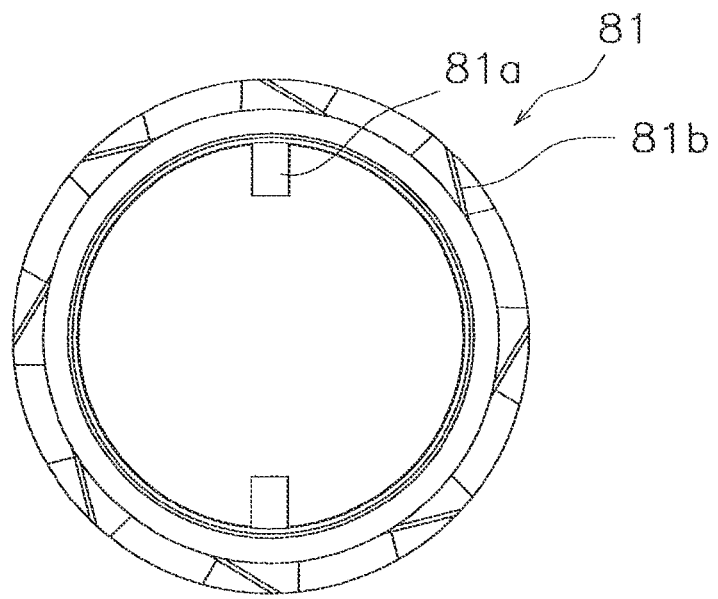
FIG. 9 is an elevational view of a cam bearing member of the internal gear hub that is illustrated in FIG. 3.
Figure 10:
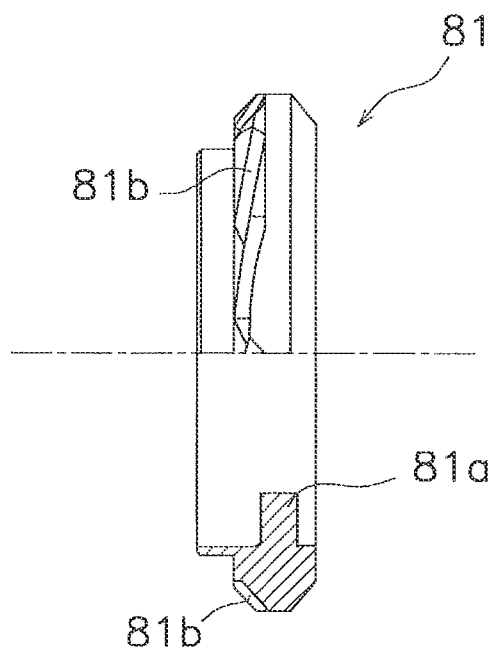
FIG. 10 is a half cross sectional view of the cam bearing member that is illustrated in FIG. 9.

As shown in FIGS. 9 and 10, the cam bearing member 81 is a ring-shaped member having a pair of cam bearing pins 81*a* arranged and configured to engage with the inclined cams 80*c*. The cam bearing pins 81*a* are formed on an internal circumferential surface of the cam bearing member 81 and arranged to protrude in a radially inward direction. A plurality of (e.g., eight) control surfaces 81*b* are formed on one end face (end face facing away in FIG. 8) of the cam bearing member 81. The control surfaces 81*b* serve to switch the third clutch pawls 74 between an upright state in which they engage with the third ratchet teeth 75 and a prone state in which they separate from the third ratchet teeth 75. The control surfaces 81*b* are spaced apart from one another along a circumferential direction and each has a rum surface that is sloped along a radial direction and a circumferential direction.

As shown in FIG. 3, the cam bearing member 81 is biased in an axially outward direction (rightward in FIG. 3) by a coil spring 83 that is arranged between the cam bearing member 81 and the carrier 40. When a turning member 94 (described later) of the operating mechanism 70 turns in a direction that is clockwise from the perspective of FIG. 8, the cam bearing pins 81*a* of the cam bearing member 81 engage with the inclined cams 80*c* of the cam member 80 and the cam bearing member 81 moves in an axially inward direction (leftward in FIG. 3) against the spring force of the coil spring 83. The axially inward movement of the cam bearing member 81 causes the control surfaces 81 to push the third clutch pawls 74 from an upright orientation to a prone orientation. As a result, the third one-way clutch 72 is put into a disconnected state. Meanwhile, the third one-way clutch 72 returns to a connected state when the turning member 94 turns counterclockwise from the perspective of FIG. 8.

Figure 11:
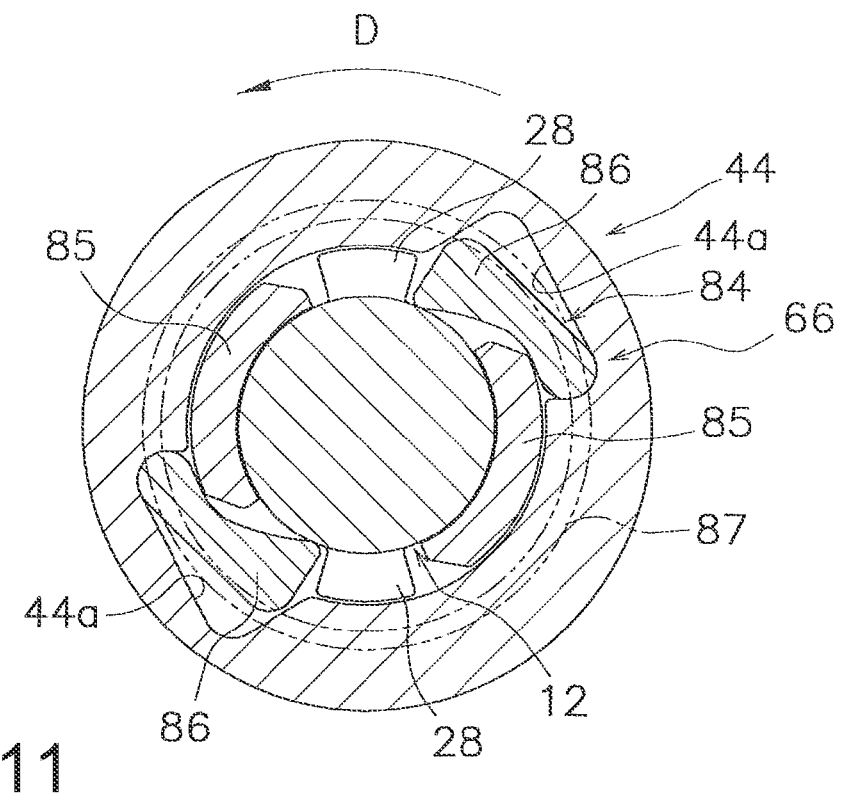
FIG. 11 is a transverse cross sectional view of a second clutch mechanism of the internal gear hub that is illustrated in FIG. 3 with the second clutch mechanism being in a connected state.
Figure 12:
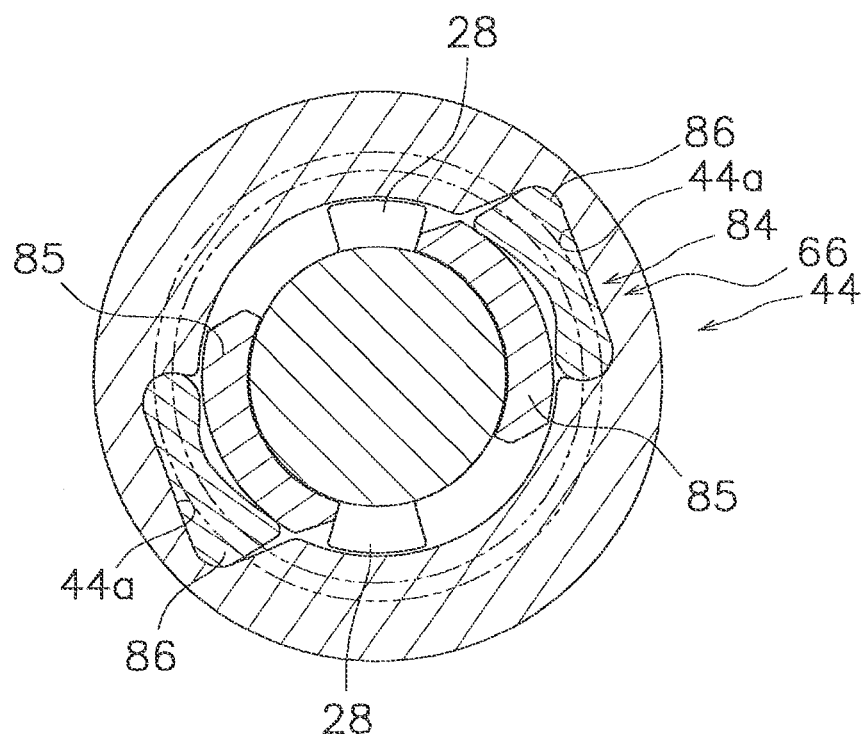
FIG. 12 is a transverse cross sectional view of the second clutch mechanism of the internal gear hub that is illustrated in FIG. 3 with the second clutch mechanism being in a disconnected state.

As shown in FIGS. 11 and 12, the second clutch mechanism 66 has a fourth one-way clutch 84 arranged between the shaft 12 and the second sun gear 44 and a second controller 85 that controls the fourth one-way clutch 84 to a connected state or a disconnected state.

When the fourth one-way clutch 84 is in the connected state shown in FIG. 11, the second sun gear 44 is prohibited from rotating in a forward advancement direction indicated with an arrow D. The fourth one-way clutch 84 comprises fourth clutch pawls 86 and the first protrusions 28. The fourth clutch pawls 86 are mounted in a plurality of (e.g., two) fourth mounting recesses 44a formed in an internal circumferential surface of the second sun gear 44 such that the fourth clutch pawls 86 can pivot freely between an upright state and a prone state, and the first protrusions 28 are formed on an external circumferential surface of the shaft 12 and configured to mesh with the fourth clutch pawls 86. The fourth clutch pawls 86 are biased toward an upright state in which they mesh with the first protrusions 28 by a fourth spring member 87 that is mounted onto an internal circumferential surface of the second sun gear 44.

The second controller 85 comprises a pair of members each having a circular arc-shaped cross section and formed as an integral portion of the second cylindrical operating part 92. The second controller 85 is arranged in close proximity to a right side face (FIG. 3) of the first protrusions 28 of the shaft 12. When the second cylindrical operating part 92 turns about the shaft 12, the second controller 85 turns between a connect position shown in FIG. 11 and a disconnect position shown in FIG. 12. When the second controller 85 is in the disconnect position, the fourth clutch pawls 86 are pushed into a prone orientation such that the fourth one-way clutch 84 is disconnected and the second sun gear 44 can rotate in the forward advancement direction.

As shown in FIGS. 3 and 8, the operating mechanism 70 comprises a turning member 94 and a return member 96. The turning member 94 is configured to turn in coordination with the second cylindrical operating part 92. The return member 96 is configured to turn in coordination with the second cylindrical operating part 92. The operating mechanism 70 also has a first torsion spring 97 and a second torsion spring 98.

The turning member 94 is a circular disk-shaped member made by press forming a metal plate-like material. The turning member 94 serves to turn the cam bearing member 81 in response to turning of the holding member 88. The turning member 94 has a main body section 94a shaped generally like a washer and a pair of engaging pieces 94b that are arranged on substantially opposite sides of an external circumference of the main body section 94a and bent over at 90-degree angles. First engaging recesses 94c configured to engage with the tip end portions 90d of the first connecting pieces 90b of the first cylindrical operating part 90 and second engaging recesses 94d configured to engage with the tip end portions 92b of the second connecting pieces 92a of the second cylindrical operating part 92 are formed in an internal circumferential surface of the main body section 94a. Holding slots 94e configured to hold the cam bearing pins 81a of the cam bearing member 81 such that the cam bearing pins 81a can move freely in the axial direction are formed in middle portions of the engaging pieces 94b. One of the engaging pieces 94b has a spring engaging hole 94f configured to engage with another end 98b of the second torsion spring 98.

The return member 96 is a circular disk-shaped member made by press forming a metal plate-like material. The return member 96 serves to transfer a spring force of the first torsion spring 97 to the first and second cylindrical operating parts 90 and 92 such that the first and second cylindrical operating parts 90 and 92 turn counterclockwise from the perspective of FIG. 8. First engaging recesses 96a configured to engage with the tip end portions 90d of the first connecting pieces 90b of the first cylindrical operating part 90 and second engaging recesses 96b configured to engage with the tip end portions 92b of the second connecting pieces 92a of the second cylindrical operating part 92 are formed in an internal circumferential portion of the return member 96. A spring engaging hole 96c configured to hold one end 97a (right end in FIG. 8) of the first torsion spring 97 is formed in a side portion of the return member 96.

The first torsion spring 97 is, for example, a coil spring that acts as a return spring for the first and second cylindrical operating parts 90 and 92. That is, when the transmission mechanism motor unit 140a moves the holding member 88 from the high gear position to the intermediate gear position or from the intermediate gear position to the low gear position, the first and second cylindrical operating parts 90 and 92 and the holding member 88 are turned counterclockwise from the perspective of FIG. 8. As explained previously, one end 97a of the first torsion spring 97 is held by the return member 96 and the other end 97b is held by the second pawl support part 58, which is arranged non-rotatably with respect to the shaft 12.

The second torsion spring 98 is, for example, a coil spring, and acts to cause the first cylindrical operating part 90 and the second cylindrical operating part 92 to move in a coordinated manner. More specifically, when the third one-way clutch 72 or the fourth one-way clutch 82 is in a state of transmitting power and cannot be changed (operated) to a disconnected state, the second torsion spring 98 serves to turn the second cylindrical operating part 92 after the power transmitting state is released. The second torsion spring 98 is arranged with one end 98a held by the first cylindrical operating part 90 and the other end held by the turning member 94. Rotation of the first cylindrical operating part 90 is transmitted to the second cylindrical operating cylinder 92 through the second torsion spring 98 and the turning member 94.

The operation of the gear changing mechanism 20 in response to operation of the transmission mechanism motor unit 140a will now be explained.

When the holding member 88 is positioned into the high gear position by the operation of the transmission mechanism motor unit 140a, the cam bearing member 81 of the first controller 73 separates from the third clutch pawls 74 of the third one-way clutch in the first clutch mechanism 64. Consequently, the third one-way clutch enters a connected state and transmits the rotation of the driver 16 to the carrier 40. Thus, the planetary gear mechanism 32 does not operate and the rotation of the driver 16 is transmitted directly to the output part 14 through the carrier 44 and the one-way clutch 50. Then, ultimately, the rotation of the driver 16 is transmitted to the third gear wheel 142. The path by which torque is transmitted from the driver 16 through the carrier 40 to the output part 14 is an equal speed transmission path in which the function of the planetary gear mechanism 32 is not used.

When the holding member 88 is moved from the high gear position to the intermediate gear position by the operation of the transmission mechanism motor unit 140a, the holding member 88 turns and causes the first cylindrical operating part 90 to turn counterclockwise from the perspective of FIG. 8. As a result, in the first clutch mechanism 64, the cam bearing member 81 of the first controller 73 turns clockwise from the perspective of FIG. 8 and moves leftward from the perspective of FIG. 3 so as to push the third clutch pawls 74 of the third one-way clutch 72 into a prone state. However, when a rider is pedaling the pedals 100, the cam bearing member 81 cannot press against the third clutch pawls 74 of the third one-way clutch 72 because the third clutch pawls 74 are in a state of transmitting power. Therefore, even if the first cylindrical operating part 90 rotates, the turning member 94 and the second cylindrical operating part 92 do not rotate and the second torsion spring 98 flexes and stores a force. From this state, if the rider stops pedaling the pedals 100, then the spring force of the second torsion spring 98 will cause the turning member 94 and the second cylindrical operating part 92 to turn clockwise. As a result, the first clutch member will enter a disconnected (released) state and the planetary gear mechanism 32 will be operated by the ring gear 34 provided on the driver 16, In the intermediate gear position, the second clutch mechanism 66 is in the connected state shown in FIG. 11. Consequently, the second sun gear 44 is prevented from rotating in a reverse direction and does not rotate when the ring gear 34 rotates in a forward advancement direction. Thus, the speed of the rotation of the driver 16 is reduced according to a gear ratio determined by the meshing of the second planet gears 38 with the second sun gear 44 before the rotation is transmitted to the carrier 40 in the forward advancement direction. The rotation of the carrier 40 is transmitted to the output part 14 through the one-way clutch 50. As a result, the speed of the rotation of the output part 114 is reduced in comparison with the high gear position. Meanwhile, when a rider is not pedaling the pedals 111, the turning member 94 and the second cylindrical operating part 92 turn in coordination with the first cylindrical operating part 90.

A path in which the speed of rotation of the driver 16 is reduced as it is transmitted to the carrier 40 through the second planet gear 38 and the second sun gear 44 is a speed reduction transmission path having the higher gear ratio between two speed reduction transmission paths.

Figure 15:
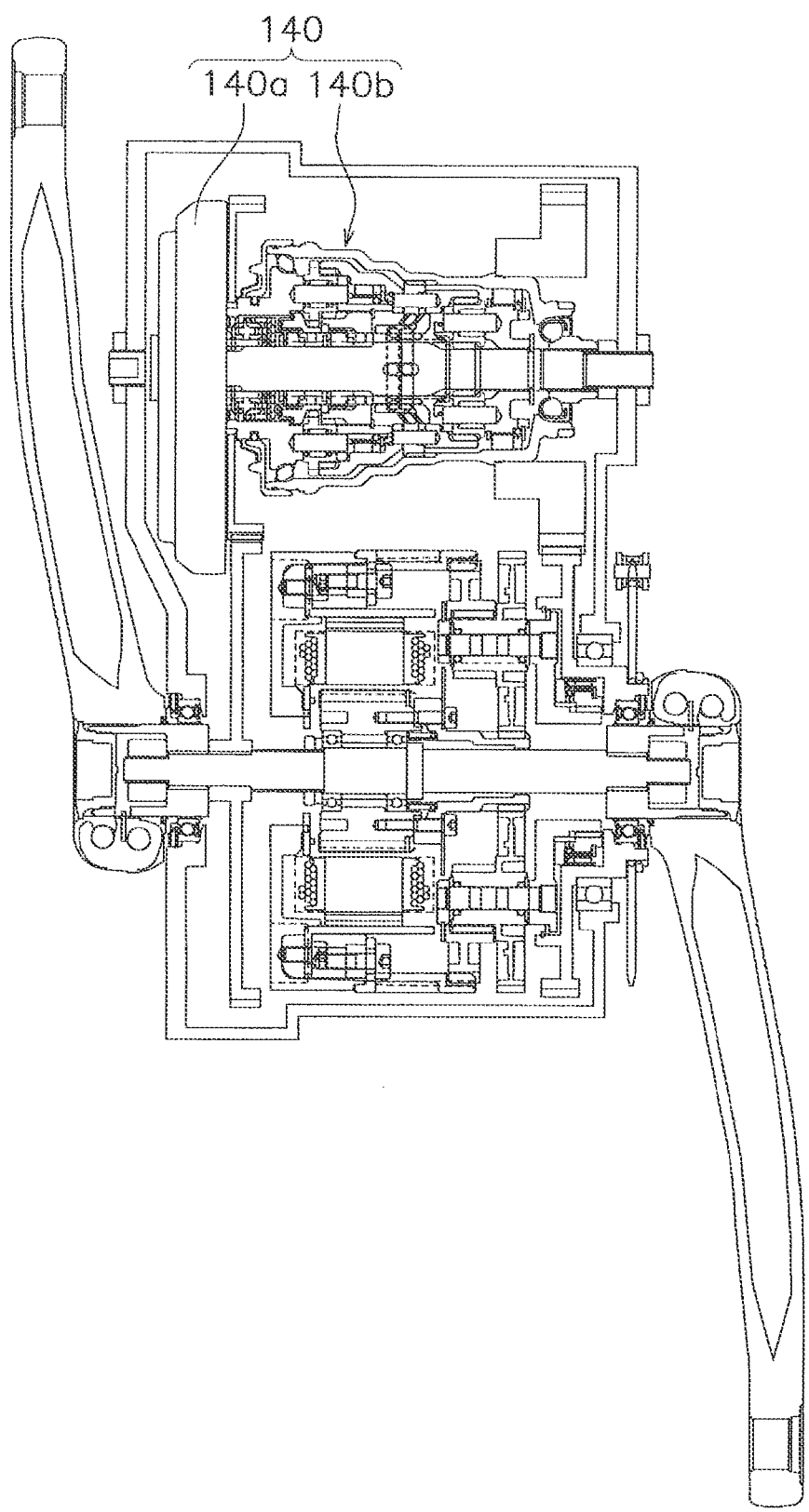
FIG. 15 is a cross sectional view of a drive unit according to a variation of the first embodiment.
Figure 16:
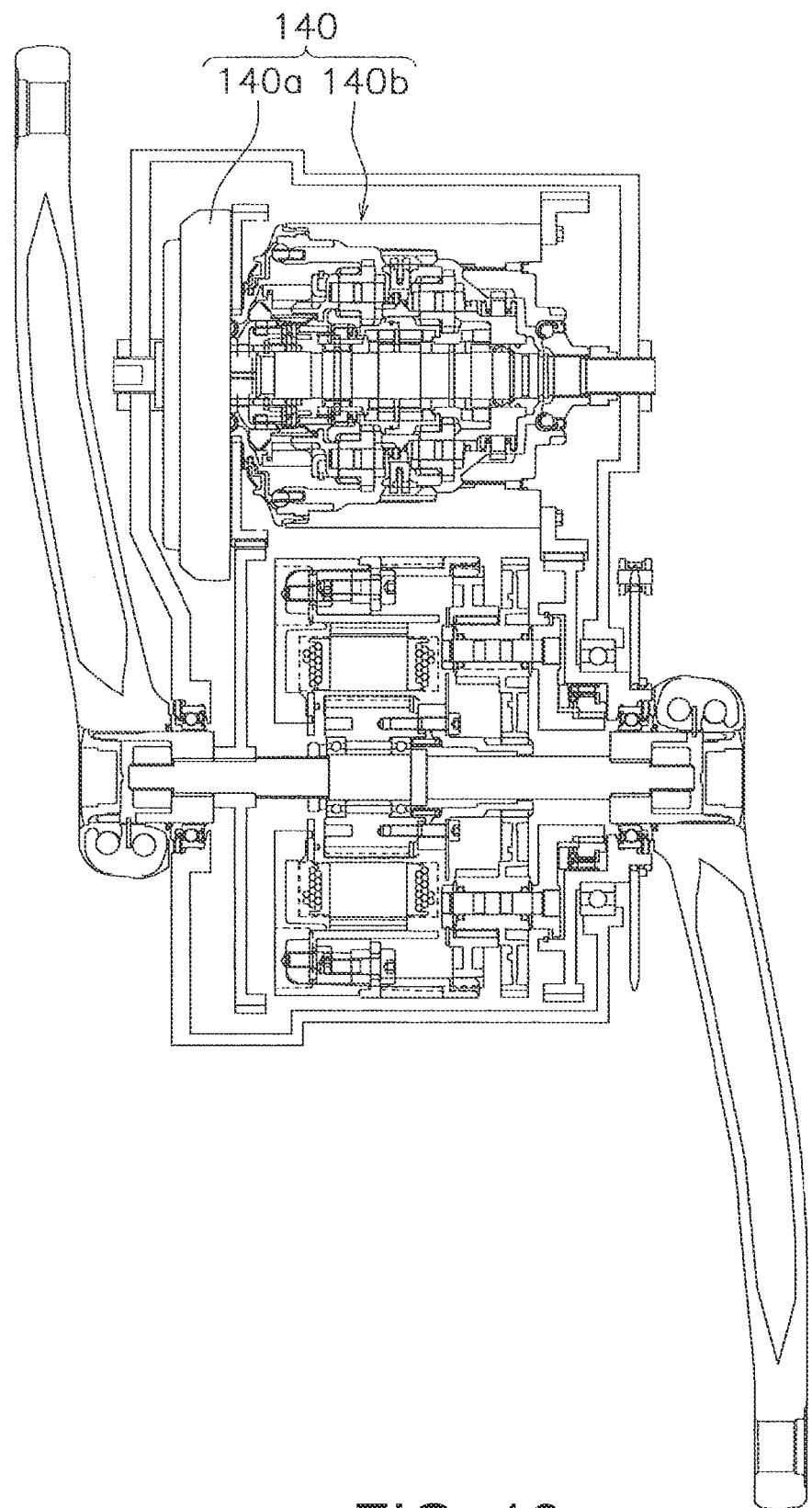
FIG. 16 is a cross sectional view of a drive unit according to a variation of the first embodiment.
Figure 17:
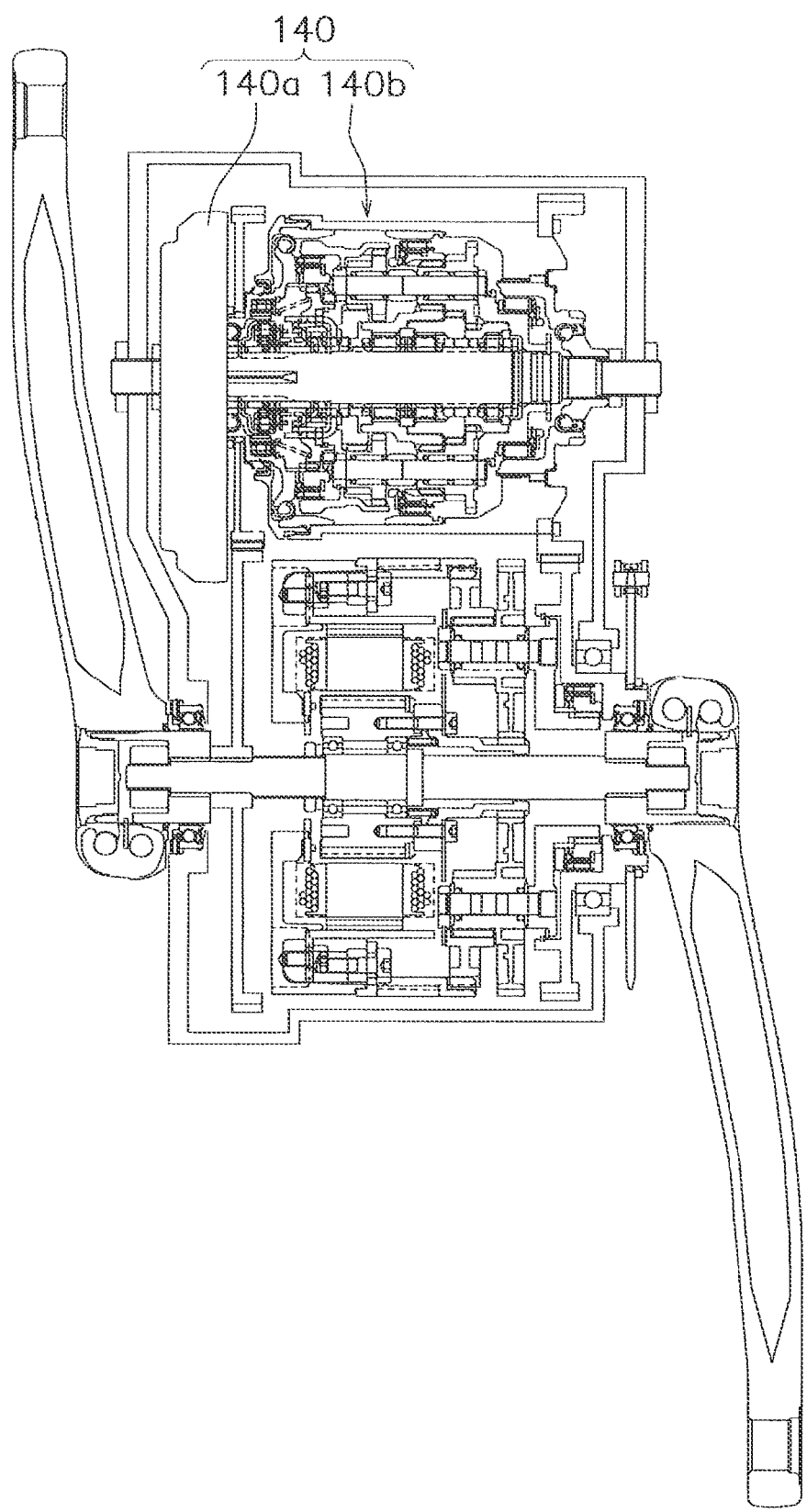
FIG. 17 is a cross sectional view of a drive unit according to a variation of the first embodiment.
Figure 18:
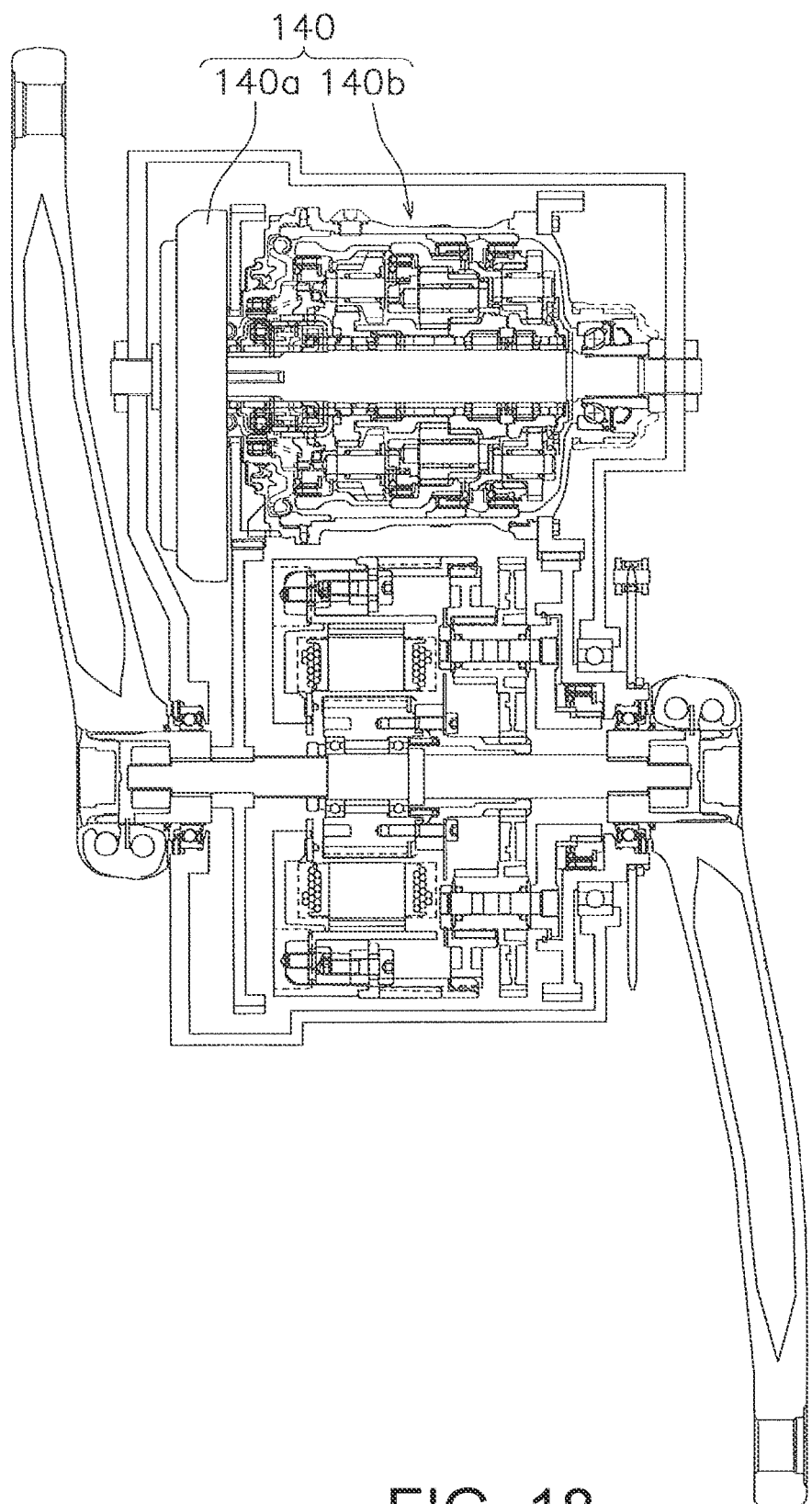
FIG. 18 is a cross sectional view of a drive unit according to a variation of the first embodiment.

When the transmission mechanism motor unit 140*a* turns the holding member 88 from the intermediate gear position to the low gear position, the output part and the first clutch mechanism 64 remain in a connected state. Meanwhile, in the second clutch mechanism 66, the second controller 85 overlaps the first protrusions 28 of the shaft 12 in a turning direction, as shown in FIGS. 12 and 15. Consequently, the fourth clutch pawls 86 cannot mesh with the first protrusions 28 and the second clutch mechanism 66 enters a disconnected state. Thus, the second sun gear 44 can rotate in either direction and ceases to function as a sun gear. As a result, rotation of the driver 16 is reduced according to a gear ratio determined by the meshing of the first planet gears 36 with the first sun gear 42 before being transmitted to the carrier 40 in the forward advancement direction. The speed of the rotation transmitted to the carrier 40 is even more reduced with the low gear position than with the intermediate gear position because the first sun gear 42 has a larger number of teeth than the second sun gear 44.

A path in which the speed of rotation of the driver 16 is reduced as it is transmitted to the carrier 40 through the first planet gear 36 and the first sun gear 42 is a speed reduction transmission path having the lower gear ratio between the two speed reduction transmission paths.

Meanwhile, when the transmission mechanism motor unit 140*a* operates so as to move the holding member 88 from the low gear position to the high gear position, a spring force of the first torsion spring 97 is transmitted to the second cylindrical operating part 92 through the return member 96 and the second cylindrical operating cylinder 92 turns clockwise from the perspective of FIG. 8. In response, the first cylindrical operating part 90 and the turning member 94 turn counterclockwise from the perspective of FIG. 8 and the gear changing mechanism 20 shifts toward a higher gear position.

The torque combining member 131 is provided on the other end of the crank axle 102. The torque combining member 131 is annularly shaped. The torque combining member 131 has a first annular portion that extends along the crank axle 102 and a second annular portion that extends in a radial direction relative to the crank axle 102 from an end portion of the first annular portion. The second annular portion is arranged on the end portion of the first annular portion that is closer to the motor 120. An outer circumferential portion of the torque combining member 131 has an externally toothed gear wheel 131*a* that constitutes a first coupling part of the torque combining member 131. The toothed gear wheel 131*a* is formed on an outer circumferential portion of the second annular portion. The externally toothed gear wheel 131*a* of the torque combining member 131 meshes with the third gear wheel 142. An inner circumferential portion of the torque combining member 131 is connected to the torque transmitting member 130 through the one-way clutch 132. The inner circumferential portion of the first annular portion has a plurality of internal clutch grooves of the one-way clutch 132. Two of the internal clutch grooves of the inner circumferential portion of the torque combining member 131 are shown in FIG. 2. These internal clutch grooves of the inner circumferential portion of the torque combining member 131 constitutes a second coupling part of the torque combining member 131. The torque combining member 131 is also provided with a rotation supporting section 133 that supports rotation of the torque transmitting member 130. The rotation supporting section 133 is provided on the second annular portion. The bearing 113 is provided on an internal circumferential portion of the torque combining member 131, and the torque combining member 131 rotatably supports the crank axle 102. The bearing 113 is provided on an inner circumferential portion of the first annular portion. A bearing 134 is provided on an external circumferential portion of he torque combining member 131, and the torque combining member 131 is rotatably supported by the casing 111. The bearing 134 is provided on an external circumferential portion of the first annular portion. The bearing 113 and the one-way clutch 132 are provided closely adjacent to each other with the first annular portion sandwiched in-between. The sprocket 103 is attached to the torque combining member 131 such that it can rotate as an integral unit with the torque combining member 131. An end portion the torque combining member 131 (end portion of the first annular portion) protrudes through the hole 111A to the outside of the casing 111. The sprocket 103 is removably attached to the end portion of the first annular portion of the torque combining member 131 with, for example, a bolt.

The operation of the drive unit 1 will now be described. A torque resulting from a pedaling force of a rider is transmitted as follows through the transmission mechanism: the crank arms 101→the crank axle 102→the first gear wheel 114→the second gear wheel 141→the transmission mechanism main body 140*b*→the third gear wheel 142→the torque combining member 131. Meanwhile, output torque from the motor 120 is transmitted as follows: the reduction gear mechanism 125→the torque transmitting member 130→the one-way clutch 132→the torque combining member 131. The torque combining member 131 combines the two torques and transmits the combined torque to the sprocket 103. In this way, motor assistance is accomplished.

The effects of this embodiment will now be explained. Since the drive unit according to this embodiment is configured such that the crank axle and the output axle of the assistance motor are coaxial, it is possible to achieve a lightweight and compact drive unit that has both a transmission mechanism and a motor for assisted riding.

Also, since the output torque of the motor is not transmitted as an input torque to the transmission mechanism, a rider can perform smooth gear changing even if the transmission mechanism has a planetary gear mechanism similar to an internal transmission mechanism. Also, since the transmission mechanism enables a plurality of gear ratios to be set selectively, the assistance drive provided by the motor can be utilized efficiently.

With the transmission mechanism 140 according to the embodiment, the speed reduction transmission paths of the planetary gear mechanism 32 are not used with respect to the highest gear position, which is used with a comparatively high frequency in a typical assisted bicycle. Consequently, the structurally complex planetary gear mechanism is used less frequently and the transmission mechanism 140 can maintain a longer service life.

Figure 14:
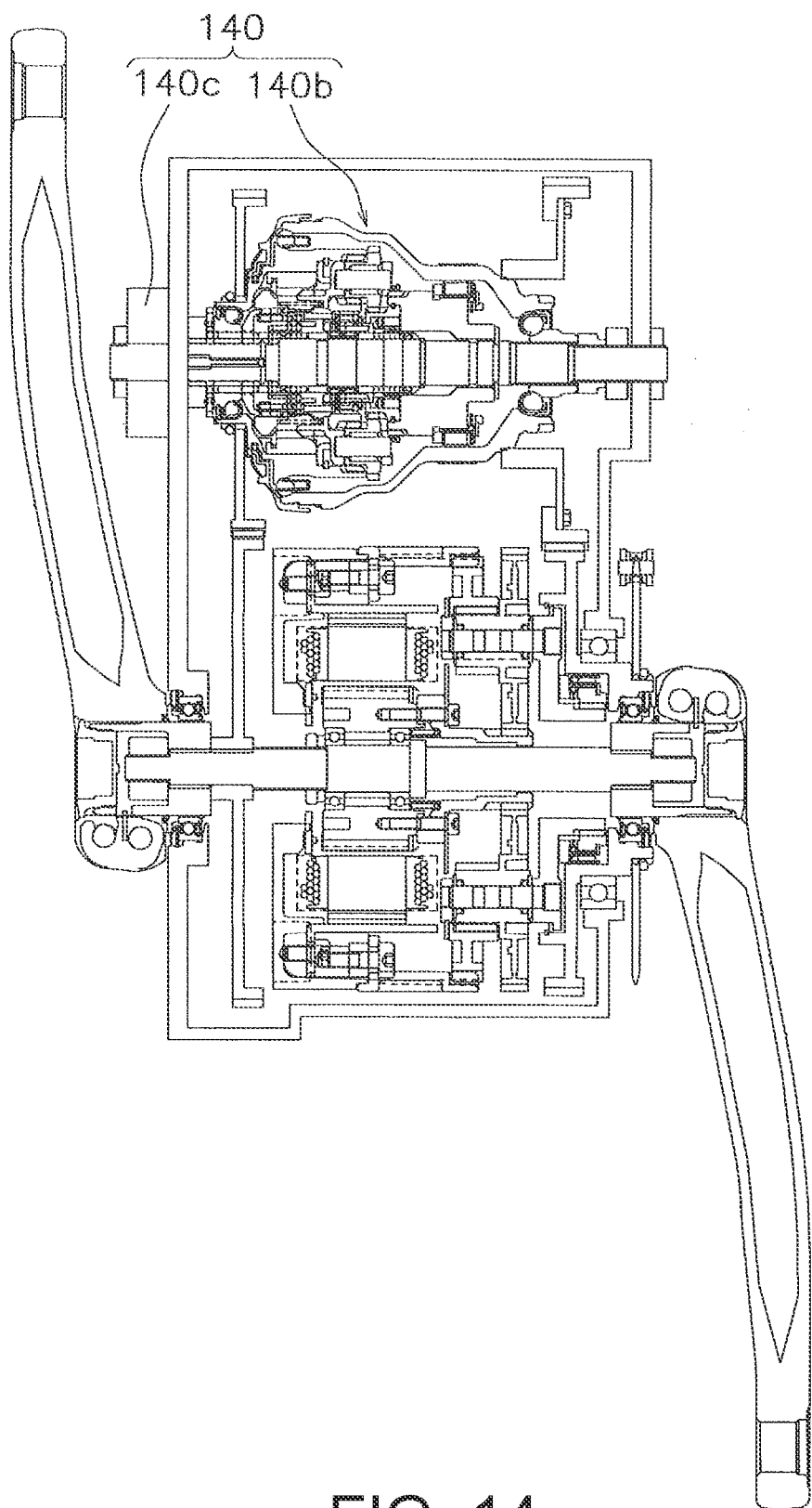
FIG. 14 is a cross sectional view of a drive unit according to a variation of the first embodiment.

Although in this embodiment the transmission mechanism 140 is configured such that the holding member 88, the first cylindrical operating part, and the second cylindrical operating part turn about the shaft, the transmission mechanism is not limited to such a configuration. For example, a drive unit can be realized using a transmission mechanism similar to an internal gear hub mechanism having a bell crank and a push rod that is moved in an axial direction by the bell crank. FIG. 14 shows an example in which such a transmission mechanism is used. The transmission main body 140b disclosed in FIG. 14 is an internal gear hub disclosed in Japanese Patent Publication No. 342559. This transmission 140 also has a transmission mechanism motor unit 140a and a shifting mechanism 140c that includes a bell crank and operates according to a shifting action received from a gear shifter (not shown in the drawings) attached to a handlebar. The transmission main body 140b includes a push rod (not shown) that is moved in an axial direction by the bell crank.

Although the transmission mechanism 140 of the previously explained embodiment is a three speed mechanism, the transmission mechanism 140 is not limited to a three speed structure. For example, it is acceptable for the transmission mechanism 140 to have five gears, seven gears, eight gears, eleven gears, or another number of gears. The transmission mechanisms shown in FIGS. 15 to 18 each of 5 gears, seven gears, eight gears or eleven gears, respectively. Parts corresponding to the parts of the transmission mechanism shown in FIG. 2 are indicated with the same reference numerals in FIGS. 15 to 18.

Each of the transmission mechanism main bodies 140b having five gears, seven gears, eight gears and eleven gears is identical to the transmission mechanism disclosed in Japanese Patent Publication No. 4564978, Japanese Patent Publication No. 3184230, Japanese Patent Publication No. 3654845, and Japanese Patent Publication No. 4705131, respectively. It should be apparent to those Skilled in the art that each of these configurations exhibits the same effects as the first embodiment. Furthermore, the transmission mechanism is not limited to these configurations and any transmission mechanism is acceptable so long as it includes a stepdown (reduction) gear mechanism or a step-up gear mechanism.

In the embodiment and the variations thereof explained heretofore, torque is transmitted from the crank axle 102 to the transmission mechanism 140 and torque is transmitted from the transmission mechanism 140 to the torque combining member 131 using two gear wheels. However, it is acceptable to accomplish these transmissions of torque using a belt or a chain.

Although the previously explained torque coupling mechanism comprises the first gear wheel 114 and the second gear wheel 141, it is acceptable use three or more gear wheels to transmit a drive force from the crank axle 102 to the transmission mechanism 140. It is also acceptable to provide a plurality of gear wheels between the output part 14 of the transmission mechanism and the torque combining member 131 to transmit the drive force.

Instead of being a multiple-gear stepping transmission, it is acceptable for the transmission main body 140b to be a continuously variable transmission. Additionally, it is acceptable for the assistance motor 120 to be a brush motor or a brushless motor. If the assistance motor 120 can operate at a low speed, then it is acceptable to omit the reduction gear mechanism 125. In such a case, the motor output would be transmitted to the one-way clutch 132 without the rotational speed being stepped up or stepped down.

Although in the previously explained embodiment the gears are changed manually, it is acceptable for the gears to be changed automatically. In such a case, a speed sensor for detecting a speed of the bicycle is provided and the transmission mechanism 140 is shifted by controlling the transmission mechanism motor unit 140a based on the output of the speed sensor and the output from a torque detecting device.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle drive unit comprising:
a motor including a crank axle receiving hole;
a crank axle rotatably disposed in the crank axle receiving hole of the motor;
a transmission mechanism including a plurality of selectable gear ratios; and
a torque combining member operatively coupled to the motor and the transmission mechanism to combine an output of the motor and an output of the transmission mechanism together,
the crank axle and the motor being configured to rotate about a first rotational axis; and the transmission mechanism being configured to rotate about a second rotational axis offset from the first rotational axis.

2. The bicycle drive unit according to claim 1, further comprising
the crank axle receiving hole defines a rotational axis of the crank axle receiving hole and a rotational axis of the motor are coincident with each other.

3. The bicycle drive unit according to claim 1, further comprising
a sprocket is connected to an output part of the torque combining member.

4. The bicycle drive unit according to claim 1, wherein
the torque combining member is operatively connected to the output of the motor through a one-way clutch to receive the output of the motor.

5. The bicycle drive unit according to claim 1, further comprising
a reduction gear mechanism operatively connected between the torque combining member and the motor to receive the output of the motor and output torque from the reduction gear mechanism to the torque combining member.

6. The bicycle drive unit according to claim 1, further comprising
a reduction gear mechanism operatively connected between a one-way clutch and the motor to receive the output of the motor and output torque from the reduction gear mechanism to the torque combining member through the one-way clutch.

7. The bicycle drive unit according to claim 1, wherein
the crank axle is operatively connected to an input part of the transmission mechanism, and the torque combining member is operatively connected to an output part of the transmission mechanism.

8. The bicycle drive unit according to claim 7, wherein
the transmission mechanism further includes a planetary gear mechanism operatively connecting the input part to the output part.

9. The bicycle drive unit according to claim 8, wherein
the planetary gear mechanism has a carrier having at least one planet gear, and the carrier supports the output part of the transmission mechanism.

10. The bicycle drive unit according to claim 7, wherein
the input part and the output part of the transmission mechanism rotate about the second rotational axis.

11. The bicycle drive unit according to claim 1, further comprising
a torque coupling mechanism operatively connecting the crank axle and the transmission mechanism together to transmit torque from the crank axle to the transmission mechanism, the torque coupling mechanism is arranged to a first axial side of the motor along an axial direction of a rotational axis of the motor, the torque combining member is arranged on a second axial side of the motor that is opposite to first axial side of the motor.

12. The bicycle drive unit according to claim 11, wherein
the torque coupling mechanism includes at least one gear wheel.

13. The bicycle drive unit according to claim 12, wherein
an input part of the transmission mechanism includes a gear wheel that meshes with the at least one gear wheel of the torque coupling mechanism.

14. The bicycle drive unit according to claim 1, wherein
the torque combining member has a rotational axis that is coincident with a rotational axis of the crank axle.

15. The bicycle drive unit according to claim 7, wherein
the torque combining member includes a first coupling part connecting the torque combining member to the output part of the transmission mechanism, and a second coupling part connecting the torque combining member to the motor.

16. The bicycle drive unit according to claim 15, wherein
the first coupling part has an externally toothed gear wheel.

17. The bicycle drive unit according to claim 15, wherein
the second coupling part has internal clutch grooves.

* * * * *